United States Patent [19]

Patel et al.

[11] Patent Number: 4,834,413
[45] Date of Patent: May 30, 1989

[54] QUICK RELEASE HANDLE

[75] Inventors: Nathalal G. Patel, Elyria; Thomas J. Tuckowski, Berea; Raymond J. Herrmann, Westlake, all of Ohio

[73] Assignee: Invacare Corporation, Elyria, Ohio

[21] Appl. No.: 126,570

[22] Filed: Nov. 30, 1987

[51] Int. Cl.$^4$ ............................................. A45B 1/00
[52] U.S. Cl. .............................. 280/304.1; 280/250.1; 280/281.1; 403/108; 297/DIG. 4
[58] Field of Search ............... 280/242 WC, 289 WC, 280/281, 278; 297/DIG. 4; 403/108, 322, 350, 378, 379, 326, 329; 135/68; 74/55, 99 R, 99 A

[56] References Cited

U.S. PATENT DOCUMENTS 2,289,818  7/1942  Winner et al. ................. 403/108
4,056,115  11/1977  Thomas ........................ 403/108

OTHER PUBLICATIONS

Everest and Jennings 3N FreeWheeler Advertising Brochure, 6/1985.
Invacare Rolls 2000 LT Advertising Brochure, Mar. 1987.
Invacare Rolls 500 ATS and 500 STS Advertising Brochure, Oct. 1986.
Invacare Rolls 400/Deluxe 200/DLW 200 and 200 Series Advertising Brochure, Sep. 1985.
Invacare Rolls Prescription Wheelchairs, 900 Series, Advertising Brochure, May 1986.
Invacare Rolls Elite Advertising, Brochure, 7/1976.

Primary Examiner—Charles A. Marmor
Assistant Examiner—Donn McGiehan
Attorney, Agent, or Firm—Fay, Sharpe, Beall, Fagan, Minnich & McKee

[57] ABSTRACT

A collar or body portion (40) has an inner surface (42) that defines a circular bore (44) therethrough. A cam surface (46) is recessed into the collar portion from the circular bore. The collar is disposed with a tubular member (22) extending through the circular bore with a spring biased detent (30) engaging the cam surface. A series of upper plateaus or segments (60) and lower plateaus or segments (62) hold the detent against the cam surface as the collar is rotated. A handle portion (64) facilitates manually rotating the collar to depress or release the spring biased detent.

15 Claims, 3 Drawing Sheets

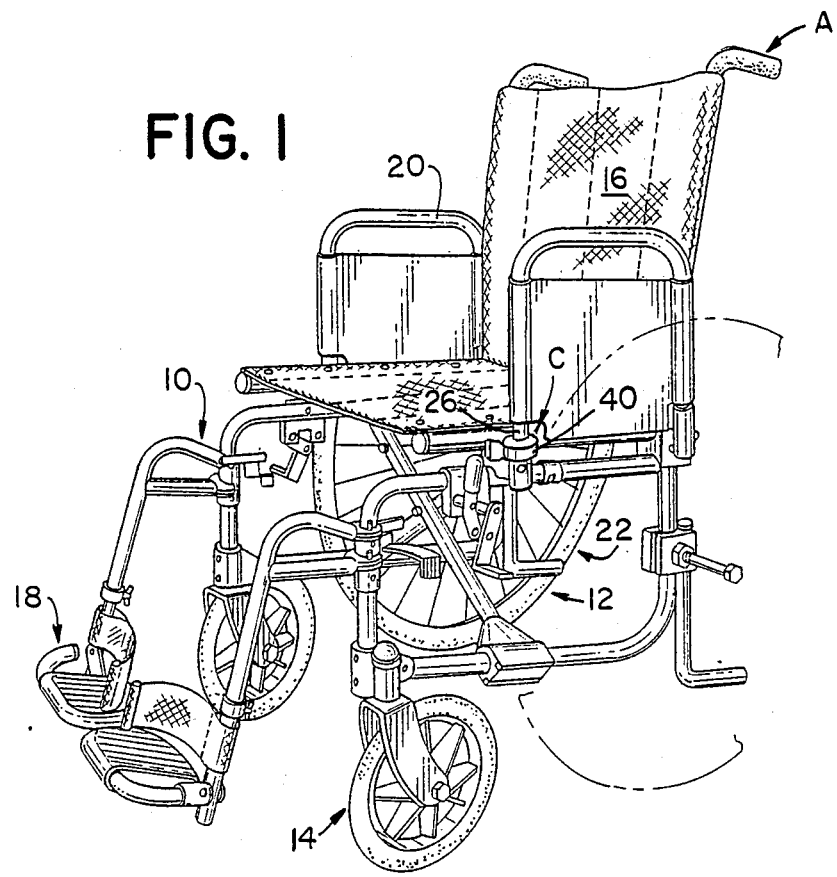
FIG. 1
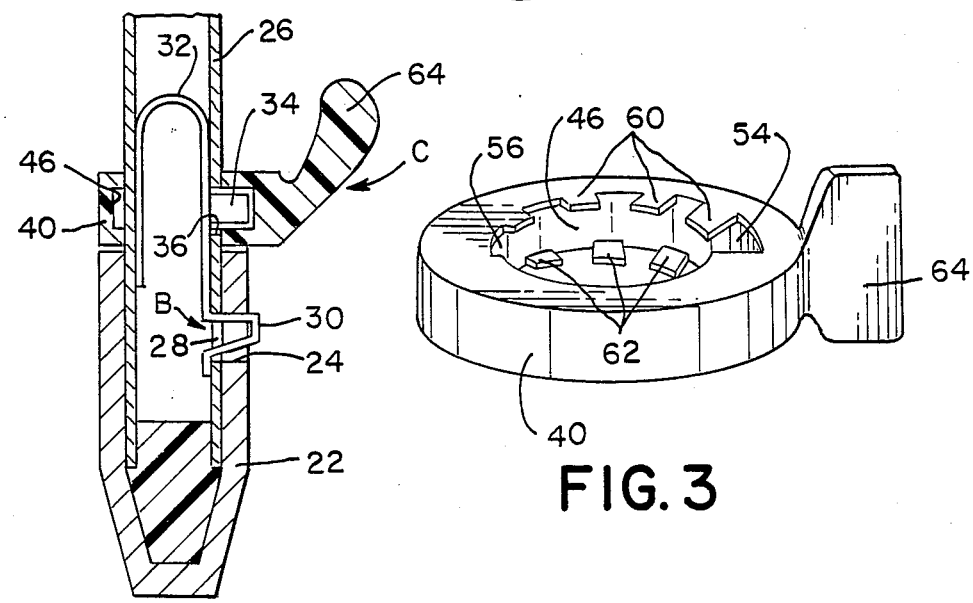
FIG. 2
FIG. 3

QUICK RELEASE HANDLE

BACKGROUND OF THE INVENTION

The present invention relates to the art of patient aid and invalid care devices. It finds particular application in conjunction with releasing swing-away arm rests and will be described with particular reference thereto. It is to be appreciated, however, that the present invention is also applicable to releasing catches and locks on crutches, commodes, walkers, other parts of wheelchairs, and other patient aids.

Heretofore, many patient aids have been constructed of tubular materials. Adjustable and removable parts commonly interengage telescopically. The telescopically received tubing had a pair or series of matching holes through which a locking detent could selectively pass. When the detent extended through the apertures of both tubes, the tubes were locked against telescopically sliding movement. By pressing the detent with a thumb or finger below the level of the outer tubing, the blocking interaction of the detent was defeated and the tubes could be moved slidably relative to each other.

One of the problems with the spring biased detents is that their operation requires a relatively high degree of manual dexterity. Quadraplegics, the elderly, and other patients frequently lacked sufficient dexterity or finger strength to release the detents. These patients commonly required assistance to remove the removable arms of wheelchairs and make other spring biased detent adjustments.

To accommodate those with less manual dexterity or finger strength, other types of latches were developed. In one example, the detent was replaced with a pin that was pulled outward by a large handle, rather than pushed inward to release the lock. Others used a more elaborate lock in which a large slide member caused a locking pin to retract and extend. As another example, a pivotally mounted member selectively pivoted between a locking and releasing position. Although these other locks were operable with less manual dexterity, they had several other drawbacks. First, these locks were relatively expensive to manufacture and difficult to repair. Further, these release mechanisms had to be factory installed and could not be used to replace the prior art spring detents on existing equipment.

The present invention contemplates a new and improved lock release system which overcomes the above referenced problems and others.

SUMMARY OF THE INVENTION

In accordance with a first aspect of the present invention, a release member body has an inner surface which defines an axial bore or hole therethrough that is received on an elongated member or tube. The inner surface defines a cam surface for selectively urging a spring biased detent that extends through the elongated member against its spring bias as the body is moved relative to the elongated member.

In accordance with a more limited aspect of the present invention, a release member is provided for selectively depressing a spring biased detent which projects through aligned apertures of telescopically received tubes. A collar portion is slidably received on a peripheral surface of the outermost tube adjacent the detent. The collar has an inner cam surface which selectively urges the detent against its spring bias as the collar portion slides in a first direction and permits the spring bias to urge the detent outward as the collar slides in a second direction. A manual engagement means is connected with the collar for facilitating manual sliding thereof relative to the outermost tube.

In accordance with a yet more limited aspect of the present invention, the collar is mounted on telescopically received tubing portions of a wheelchair, such as on a removable arm support structure.

One advantage of the present invention is that it facilitates the release of connected parts by patients with limited or impaired manual dexterity and strength.

Another advantage of the present invention is that it is relatively inexpensive to manufacture and easy to install and repair.

Yet another advantage of the present invention is that it can be installed in conjunction with existing spring detent catches by the patient without tools.

Still further advantages of the present invention will become apparent to those of ordinary skill in the art upon reading and understanding the following detailed description of the preferred embodiments.

BRIEF DESCRIPTION OF THE DRAWINGS

The invention may take form in various parts and arrangements of parts. The drawings are only for purposes of illustrating a preferred embodiment and are not to be construed as limiting the invention.

FIG. 1 is a perspective view of a wheelchair in accordance with the present invention;

FIG. 2 is a cross sectional view of telescopically received tubing, spring biased detent, and quick release handle;

FIG. 3 is perspective view of a quick release handle in accordance with the present invention;

DETAILED DESCRIPTION OF THE PREFERRED EMBODIMENT

Figure 4:
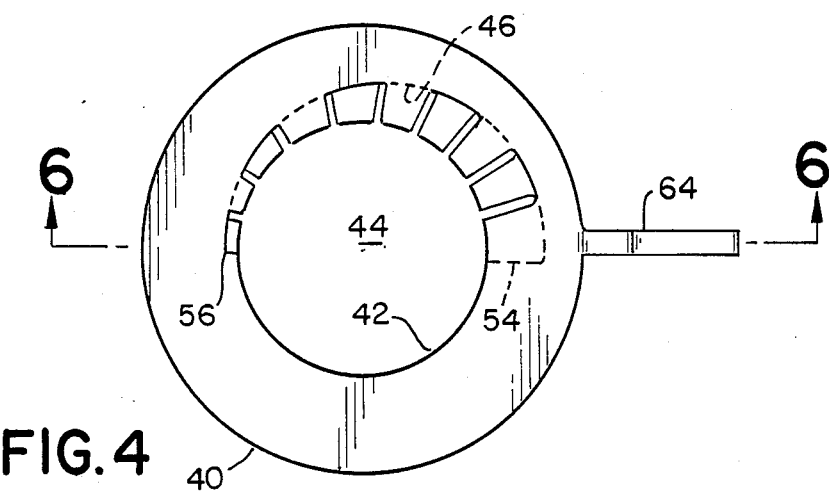
FIG. 4 is a top view of the quick release handle.
Figure 5:
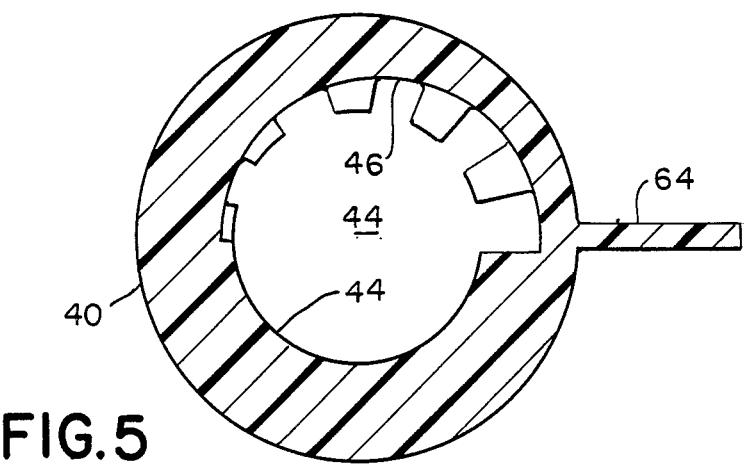
FIG. 5 is a sectional view through section 5—5 of FIG. 6.
Figure 6:
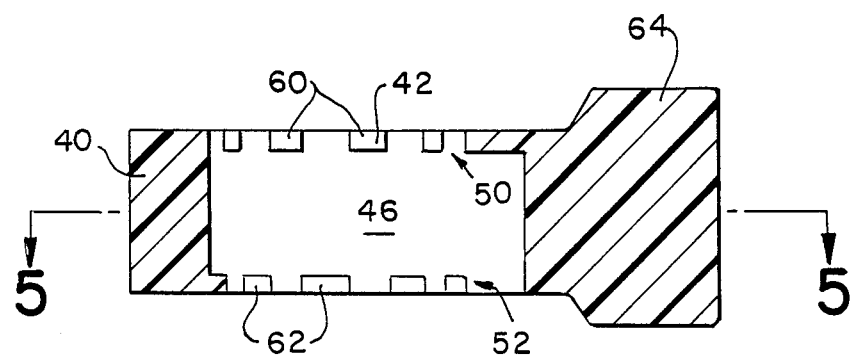
FIG. 6 is a sectional view through section 6—6 of FIG. 4.

With reference to FIGS. 1 and 2, a patient aid, particularly a wheelchair A includes a plurality of tubular members at lesat some of which are telescopically interconnected. A spring biased detent assembly B interengages apertures in the telescopically received tubing to lock their relative position. A quick release handle C is mounted around the tubular members for selectively operating the spring biased detent.

More specifically, the wheelchair A includes a main frame portion 10 which is rollably supported on rear wheels 12 and front wheels 14. The patient's body is supported on a seat portion 16 and the patient's feet are supported on a foot rest assembly 18. A pair of removable or pivotal arm rests 20 are mounted to either side of the seat portion for supporting the patient's arm. The arms are removable or tippable to facilitate moving the wheelchair close to a desk or table, to enable the patient to slide laterally to another conveyance or piece of furniture or the like.

With continuing reference to FIG. 1 and particular reference to FIG. 2, the wheelchair frame portion includes an upstanding tubular stub 22 having an aperture 24 therein. The arm rest includes a forward tubular portion 26 having a lower aperture 28 therein. The spring detent assembly B includes a first or lower detent 30 which extends through the tubing apertures 24 and 28 when aligned. A leaf spring 32 urges the detent outward through the apertures and provides a stop for preventing the detent from being removed through the apertures. When a second detent 34 which extends through an upper aperture 36 is depressed sufficiently that the first detent is below an inner surface of the outer tube 22, an axially applied force on the inner tube 26 causes the tubular members 22 and 26 to be separated.

With continuing reference to FIG. 2 and further reference to FIG. 3, the quick release handle C includes a collar portion 40 that extends around the periphery of the outer tube 22. The collar portion has an inside surface 42 which defines an axial bore or hole therethrough. The interior surface 42 has substantially the same diameter as the outer tube 22 such that the collar can slide freely, particularly in a rotational mode, thereon. The inner surface further defines a cam surface 46 recessed outward beyond the diameter of the outer tube. The cam surface 46 has a height between an upper detent retaining surface 50 and a lower detent retaining surface 52 that is at least as high as the diameter of the detent, such that the detent is freely receivable therein. The cam surface extends about 180° around the interior surface from a deep end 54 in which the detent is fully and freely received in its extended condition to a shallow end 56 in which the detent is depressed against the bias of the spring 32 substantially to the surface of the outer tube 22. The cam surface changes depth gradually between its ends. When the detent is disposed adjacent the deep end 54, rotation of the collar in a clock wise direction as shown in FIGS. 3 and 4 causes the cam surface 46 to urge the detent inward against the spring bias. When the minimum cam surface 56 is engaging the upper detent, the second detent is sufficiently depressed that the inner tube and the lower spring detent may be moved upward and out of telescopic engagement with the outer tube. The minimum recessed cam surface 56 portion is preferably recessed slightly from the inner surface 42 such that the handle is retained on the inner tube by the detent. However, the cam surface may merge smoothly into the inner surface 42 such that the detent is urged fully flush with the exterior surface of tube 22.

In the preferred embodiment, the upper detent engaging surface 50 is defined by a plurality of upper plateaus or segments 60 and the lower detent engaging surface 52 is defined by a plurality of lower plateaus or segments 62. An inner most end of the plateaus lies on the inner surface 42. The upper and lower plateaus alternate to facilitate molding. However, the upper and lower plateaus are spaced sufficiently close compared with the diameter of the detent that the detent does not pass therethrough. More specifically, the mold includes a plurality of separated finger members which come down from the top between the upper plateaus 60 to define the cam surface 46 and a plurality of meshing fingers that come upward between the lower plateaus 62 to define the remainder of the cam surface 46. After the handle is injection molded, the mold portions are separated axially to release the injection molded plastic handle. Optionally, the upper and lower surfaces may be continuous. However, a more complex molding or manufacturing procedure may be required.

The operator may grip the periphery of the collar 40 in order to turn the collar and cam the detents inward or turn the collar to permit the spring to urge the detents outward. A handle 64 extends outward from the collar to increase the leverage or mechanical advantage. Moreover, the extension 64 further provides a larger interaction surface which is readily struck by those with greatly impaired manual dexterity. Optionally, other means for facilitating manual interaction with the handle may be provided.

Figure 7:
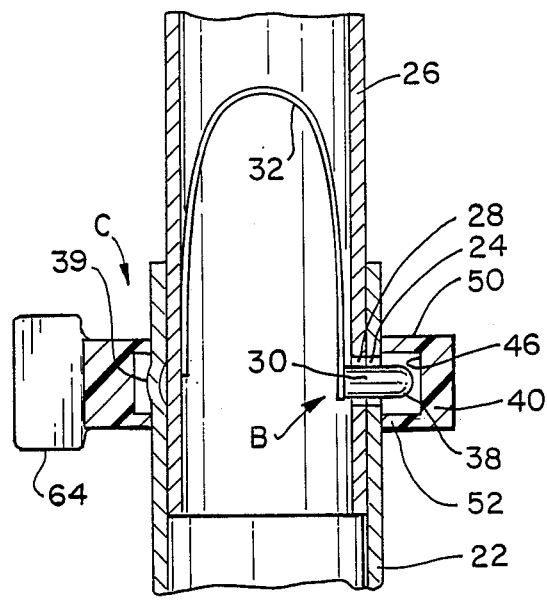
FIG. 7 is a perspective view of an alternate embodiment of the quick release handle in combination with a length of tubing; and, FIG. 8 is a top view of an other alternate embodiment of the quick release handle.

With reference to FIG. 7, the quick release handle may be mounted on the same detent which locks two lengths of tubing together. More specifically, the detent 30 may be pressed into the tubing by the cam surface 46 a sufficient distance that cam surface 38 on the detent is below the inner surface of the outer tube 22. Axial uncoupling pressure on the two tubes causes the cam surface 38 to cam detent 30 fully below the outer tube 22 allowing the tubes to be separated. To keep the handle C from sliding off of the outer tube when the detent is removed, a dimple 39 is stamped into the outer tube. The upper detent engaging surface 50 may be continuous rather than segmented. Likewise, the lower detent engaging surface 52 may be continuous or in some applications might be eliminated.

Figure 8:
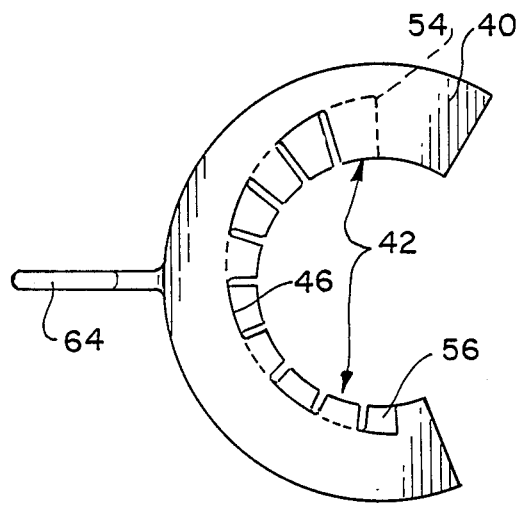

In the alternate embodiment of FIG. 8, the collar portion 40 extends less than fully around the periphery of the outer tube. This enables the collar to be snapped around the tube or slid over the tube axially. The discontinuity in the collar periphery facilitates molding of the handle.

The invention has been described with reference to the preferred embodiment. Obviously, modifications and alterations will occur to others upon reading and understanding the preceding specification. It is intended that the invention be construed as including all such alterations and modifications in so far as they come within the scope of the appended claims or the equivalents thereof.

Having thus described the preferred embodiment, the invention is now claimed to be:

1. A wheelchair comprising:
    a frame having a plurality of tubular members, a first of the tubular members being telescopically received in a second tubular member, the first and second tubular members defining aligned first and second apertures, respectively;
    a spring biased detent located within the first tubular member, the detent positioned such that upon alignment of the first and second apertures, the detent projects outward from the second tubular member;
    a collar slidably received on a peripheral surface of the second tubular member, the collar having an inner surface defining an axial bore of substantially the same diameter as the second tubular member, the collar further defining an inner cam surface extending along a portion of the inner surface and away from the second tubular member for selectively causing the detent to move against its spring bias to be substantially flush with the second tubular member as the collar portion slides in one direction and for permitting the spring to bias the detent outward of the second tubular member as the collar slides in another direction;

a seat supported on the frame for supporting an operator; and, wheels operatively connected with the frame.

2. A quick release handle for releasing a spring biased detent which projects from an exterior surface of a tube, the handle comprising:

a collar received on a peripheral surface of the tube adjacent the detent for rotational movement around the tube, the collar defining a surface portion of substantially the same diameter as the tube extending around one circumferential portion of the periphery of the tube and an inner cam surface extending around an adjacent circumferential portion of the periphery of the tube for selectively urging the detent against its spring bias to be flush with the tube as the collar rotates in a first direction and for permitting the spring bias to urge the detent outward as the collar rotates in a second direction.

3. The quick release handle as set forth in claim 2 further including a manual engagement portion operatively connected to the collar portion for facilitating manual rotation of the collar peripherally around the tube.

4. The quick release handle as set forth in claim 2 wherein the cam surface extends peripherally around an inner circumferential area of the collar between the top and bottom surfaces.

5. The quick release handle as set forth in claim 2 wherein the collar has an inner circumferential surface that defines an axial bore in which the tube is received.

6. The quick release handle as set forth in claim 2 further including an upper detent engaging surface adjacent an upper edge of the cam surface for engaging upon the detent to position the collar relative thereto.

7. A quick release handle for releasing a spring biased detent which projects from an exterior surface of a tube, the handle comprising:

a collar slidably received on a peripheral surface of the tube adjacent the detent, the collar defining an inner cam surface for selectively urging the detent against its spring bias as the collar slides in a first direction and for permitting the spring bias to urge the detent outward as the collar slides in a second direction; and a series of spaced plateaus adjacent an upper edge of the cam surface for engaging the detent to position the collar relative thereto.

8. The quick release handle as set forth in claim 7 wherein the series of plateaus includes an upper series of segments which are spaced less than a peripheral dimension of the detent.

9. The quick release handle as set forth in claim 8 further including a lower series of segments disposed adjacent a lower edge of the cam surface to define a lower detent engaging surface.

10. The quick release handle as set forth in claim 9 wherein the upper and lower segments alternate, whereby the upper and lower detent engaging surface can be molded concurrently.

11. A detent release member for selectively depressing spring biased detents into an elongated member, said release member comprising:

an inner surface which defines a bore extending axially therethrough, the elongated member being axially received in the bore;

the inner surface defining a cam surface extending peripherally around the elongated member for selectively releasing spring detents;

an upper detent engaging surface extending along an upper edge of the cam surface for engaging an upper edge of the detent to assist in maintaining the detent in engagement with the cam surface; and, a lower detent engaging surface extending along a lower edge of the cam surface wherein the upper detent engaging surface is defined by a plurality of upper plateaus and the lower detent engaging surface is defined by a plurality of lower plateaus.

12. The release member as set forth in claim 11 wherein a manual engagement portion projects outwardly from said member.

13. The release member as set forth in claim 11 wherein the cam surface extends circumferentially around the axial bore for about 180°.

14. The release member as set forth in claim 13 wherein the cam surface is recessed from the inner surface, a depth of the recess varying along the cam surface.

15. The quick release handle as set forth in claim 14 wherein the upper plateaus alternate vertically with the lower plateaus.

* * * * *